United States Patent
Nadler (10) Patent No.: US 10,977,272 B2
(45) Date of Patent: Apr. 13, 2021

(54) SYSTEM AND METHOD FOR GENERATING DATA VISUALIZATION

(71) Applicant: Hashplay Inc., San Francisco, CA (US)

(72) Inventor: Ingo Nadler, Bad Breisig (DE)

(73) Assignee: Darvis, Inc., San Francisco, CA (US)

(*) Notice: Subject to any disclaimer, the term of this patent is extended or adjusted under 35 U.S.C. 154(b) by 204 days.

(21) Appl. No.: 16/215,778

(22) Filed: Dec. 11, 2018

(65) Prior Publication Data
US 2019/0179829 A1 Jun. 13, 2019

Related U.S. Application Data

(60) Provisional application No. 62/597,507, filed on Dec. 12, 2017.

(51) Int. Cl.
*G06F 16/26* (2019.01)
*G06F 16/248* (2019.01)
*G06F 3/0484* (2013.01)

(52) U.S. Cl.
CPC ........... *G06F 16/26* (2019.01); *G06F 16/248* (2019.01); *G06F 3/04847* (2013.01)

(58) Field of Classification Search
CPC .... G06F 16/26; G06F 16/248; G06F 3/04847; G06F 16/3322; G06F 16/34; G06F 16/954; G06F 16/951; G06Q 40/06; G06Q 10/0637; H04M 15/09
See application file for complete search history.

(56) References Cited

U.S. PATENT DOCUMENTS

| | | | | |
|---|---|---|---|---|
| 2003/0144868 A1* | 7/2003 | MacIntyre | ......... | G06Q 10/0637 705/7.38 |
| 2006/0212509 A1* | 9/2006 | Feigenbaum | ......... | G06F 16/954 709/201 |
| 2012/0079431 A1* | 3/2012 | Toso | ...................... | G06Q 40/06 715/836 |
| 2015/0334228 A1* | 11/2015 | Chau | ..................... | H04M 15/09 379/142.01 |
| 2016/0117403 A1* | 4/2016 | Isaacs | .................... | G06F 163/34 707/722 |
| 2016/0275195 A1* | 9/2016 | Pearcy | .................... | G06F 16/951 |
| 2018/0032539 A1* | 2/2018 | Dessau | .............. | G06F 16/3322 |

* cited by examiner

*Primary Examiner* — Etienne P Leroux
(74) *Attorney, Agent, or Firm* — Ziegler IP Law Group, LLC (57) ABSTRACT

Disclosed is system and method for generating data visualization. The system comprises a database arrangement configured to store data retrieved from one or more data sources, and a server arrangement comprising a user profile module configured to define one or more user profiles, and associate one or more data sources and data-object thereto; a receiving module configured to receive data visualization request from the user profile; and a data processing module configured to determine connections between the one or more data sources and data-object based on the user profile; select one or more data sources from the one or more data sources based on the data visualization request; retrieve data associated with the one or more selected data sources based on the data visualization request; and generate at least one data-object based on the retrieved data from the one or more selected data sources and defined connections therewith.

18 Claims, 5 Drawing Sheets

SYSTEM AND METHOD FOR GENERATING DATA VISUALIZATION

TECHNICAL FIELD

The present disclosure relates generally to data visualization; and more specifically, to generating real-time data visualization from multi-spatial, multi-temporal data sources using a distributed computing environment. The present disclosure also seeks to provide an improved computer implemented method for generating data visualization.

BACKGROUND

In the recent years, with the advancement in technology, billions of connected devices generate and exchange data. The rate of generation of data has grown exponentially in terms of amount, types and complexity of the available data. The interpretation of information from such data, is done by visualizing the data in form of graphs, flowcharts, block diagrams termed as data visualization. Generally, data visualization commonly refers to techniques utilized to communicate data or information by representing it as visual objects that can be displayed. However, when done manually, data visualization is a tedious, cumbersome and time-consuming process, often leading to inaccuracies. To increase the complexity of data to be visualized, augmented and virtual reality techniques have been implemented which leverage stereoscopic interactive imagery and utilize the entire space around the user.

Several systems, including hardware and software have been developed to visualize data from several sources of input data. However, the conventional data visualization systems are associated with a number of problems. One such problem is the collection of input data from multiple sources in an efficient and reliable manner, leading to inaccurate data visualization results. Conventional data visualization systems generally employ a single system performing all the operations, rendering the data visualization process slower due to limitations of data processing speed of a standalone system. For example, the device handling the drawing of the data visuals in a head mounted device, cannot also handle data management, receiving and filtering for performance reasons. Such conventional data visualization systems are incapable of processing data in real-time due to dimensionality and complexity of data, inadequate storage space, and slower processing speed. Furthermore, visualization has to be equally compatible with mobile devices as well as with virtual and augmented reality devices.

Therefore, in light of the foregoing discussion, there exists a need to overcome the aforementioned drawbacks associated with conventional data visualization systems and the procedures for obtaining data visualization, in particular there is a need to provide computing systems that are specifically configured for high speed visualization of data in real-time.

SUMMARY

The present disclosure seeks to provide an improved system for generating data visualization to visualize data from complex and distributed data sources in an efficient and time saving manner. The present disclosure also seeks to provide a computer implemented method for generating data visualization from complex and distributed data sources. The present disclosure seeks to provide a solution to the existing problem of errors and inaccuracies that are introduced on account of manual implementation of cumbersome, time consuming and intensive analytical and calculative methods of analysing and visualizing enormous amount of data. An aim of the present disclosure is to provide a solution that overcomes at least partially the problems encountered in the prior art, and allows for generating data visualization using specially adapted hardware systems in a reliable manner with high efficiency and accuracy, whilst reducing intensive calculation burden on an individual analysing the data.

In one aspect, an embodiment of the present disclosure provides a system for generating data visualization, the system comprising:
 a database arrangement configured to store data retrieved from one or more data sources; and
 a server arrangement comprising:
 a user profile module configured to define one or more user profiles and associate one or more data sources and data-objects to the one or more defined user profiles;
 a receiving module configured to receive a data visualization request from the user profile; and
 a data processing module configured to
 determine connections between the one or more data sources and data-objects to be visualized based on the user profile;
 select one or more data sources from the one or more data sources based on the data visualization request;
 retrieve data associated with one or more selected data sources with plurality of data-points, based on the data visualization request; and
 generate at least one data-object based on the retrieved data from the one or more selected data sources and the defined connections therewith.

Optionally, the system further comprises a first user interface to allow a user to define one or more data sources for obtaining data to be associated with the user profile.

Optionally, the data processing module is further configured to filter the retrieved data based on the data visualization request.

Optionally, the data processing module is further configured to define a grade index with a maximum value and a minimum value; determine a gradient value for each of the plurality of data-points of the retrieved data within the grade index; and assign a colour to each of the gradient value for drawing the at least one generated data-object in the visualization space.

Optionally, the database arrangement is further configured to store the retrieved data with plurality of data-points along with corresponding gradient values for later retrieval.

Optionally, the system further comprises a user device configured to draw the at least one generated data-object corresponding to the data visualization request in a visualization space associated with the user profile.

Optionally, the user device is configured to draw the at least one data-object with one or more of values and labels associated with the plurality of data-points thereof, in the visualization space.

Optionally, the system further comprises a second user interface to allow a user to generate a data visualization update request for a data-object from the at least one drawn data-object in the visualization space.

Optionally, the receiving module is further configured to receive the data visualization update request. The data processing module is configured to generate at least one updated data-object based on the data visualization update request. The user device is configured to draw the at least one updated data-object associated with the data visualization update request.

Optionally, the one or more data sources comprises one or more sensors providing sensor data.

Optionally, the one or more data sources comprises at least one database comprising one or more of related data, historic data, and legacy data for the user profile.

In another aspect, an embodiment of the present disclosure provides a computer implemented method for generating data visualization, comprising:
- defining one or more data sources for obtaining data based on a user profile;
- defining data-objects to be visualized based on the user profile;
- determining connections between the one or more defined data sources and the defined data-objects to be visualized;
- receiving a data visualization request from the user profile;
- selecting one or more data sources from the one or more defined data sources based on the data visualization request;
- retrieving data, associated with the one or more selected data sources, with plurality of data-points; and
- generating at least one data-object based on the retrieved data from the one or more selected data sources and the defined data-objects having determined connections therewith.

Optionally, the method further comprises filtering the retrieved data based on the data visualization request.

Optionally, the method further comprises drawing the at least one generated data-object corresponding to the data visualization request in a visualization space associated with the user profile.

Optionally, the at least one data-object is drawn with one or more of values and labels associated with the plurality of data-points thereof, in the visualization space.

Optionally, the method further comprises defining a grade index with a maximum value and a minimum value; determining a gradient value for each of the plurality of data-points of the retrieved data within the grade index; and assigning a colour to each of the gradient value for drawing the at least one generated data-object in the visualization space.

Optionally, the method further comprises storing the retrieved data with plurality of data points along with corresponding gradient values for later retrieval.

Optionally, the method further comprises receiving a data visualization update request from the user profile.

Optionally, the method further comprises generating at least one updated data-object based on the data visualization update request; and drawing the at least one updated data-object associated with the data visualization update request.

Optionally, the one or more data sources comprises at least one database comprising one or more of related data, historic data, and legacy data for the user profile.

Embodiments of the present disclosure substantially eliminate or at least partially address the aforementioned problems in the prior art and enable an accurate and fast rendered visualization of complex and huge amount of data in an efficient and distributed manner.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
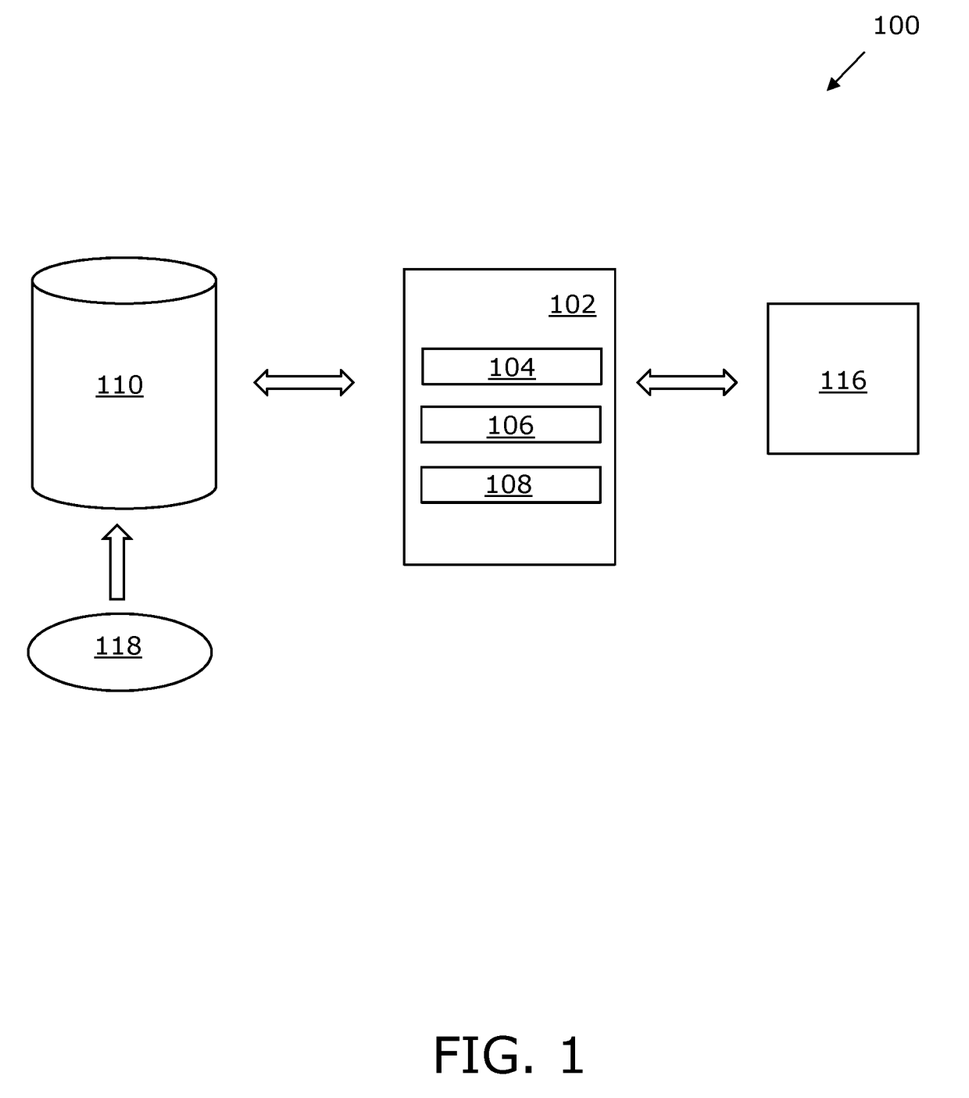
FIG. 1 is an illustration of schematic representation of a system for generating data visualization, in accordance with an embodiment of the present disclosure.

Referring to FIG. 1, in particular, illustrated is a schematic illustration of a system 100 for generating data visualization, in accordance with an embodiment of the present disclosure. For illustration purposes only, there will now be considered an exemplary environment, wherein the system 100 (sometimes, referred to as "data visualization system") for generating data visualization is implemented pursuant to embodiments of the present disclosure. Notably, the system 100 for generating data visualization comprises a server arrangement 102, a database arrangement 110 communicatively coupled to the server arrangement 102, a user device 116 associated with a user of the system for generating data visualization system 100 and in communication with the server arrangement 102, and a data source 118 communicatively coupled to the database arrangement 110. Further, the server arrangement 102 comprises user profile module 104, a receiving module 106 and a data processing module 108.

In an example, the components of the data-visualization system 100 are in communication with each other via a communication network. It will be appreciated that the communication network can be an individual network, or a collection of individual networks that are interconnected with each other to function as a single large network. The communication network may be wired, wireless, or a combination thereof. Examples of the individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, radio networks, telecommunication networks, and Worldwide Interoperability for Microwave Access (WiMAX) networks. Generally, the term "internet" relates to any collection of networks using standard protocols. For example, the term includes a collection of interconnected (public and/or private) networks that are linked together by a set of standard protocols (such as TCP/IP, HTTP, and FTP) to form a global, distributed network. While this term is intended to refer to what is now commonly known as the Internet®, it is also intended to encompass variations that may be made in the future, including changes and additions to existing standard protocols or integration with other media (e.g., television, radio, etc.). The term is also intended to encompass non-public networks such as private (e.g., corporate) Intranets.

It will be appreciated that FIG. 1 is merely an example, which should not unduly limit the scope of the claims herein. It is to be understood that the specific designation for the system 100 for generating data visualization is provided as an example and is not to be construed as limiting the system 100 to specific numbers, types, or arrangements of user devices (such as user device 116), servers, data sources (such as data source 118), and database arrangements (such as database arrangement 110). A person skilled in the art will recognize many variations, alternatives, and modifications of embodiments of the present disclosure.

Notably, the server arrangement 102 is coupled in communication with the data source 118 either directly (for real-time data), or via the database arrangement 110. It is to be noted here that the server arrangement 102 could be coupled in communication with a plurality of user devices (such as user device 116) associated with a plurality of users. Examples of the user device 116 include, but are not limited to, an augmented reality (AR) device, a virtual reality (VR) device, a mixed reality (MR) device, a mobile phone, a smart telephone, a Mobile Internet Device (MID), a tablet computer, an Ultra-Mobile Personal Computer (UMPC), a phablet computer, a Personal Digital Assistant (PDA), a web pad, a Personal Computer (PC), a handheld PC, a laptop computer, a tablet computer, a desktop computer or a combination thereof.

It will be appreciated that the aforementioned server arrangement 102 can be implemented in several ways. In an example, as mentioned, the server arrangement 102 comprises the user profile module 104, the receiving module 106 and the data processing module 108 arranged within the server arrangement 102. In such a case, the entire server arrangement 102 is communicatively coupled to the user device 116. In another example, the user profile module 104 is executed outside the server arrangement 102. In such case, the user profile module 104 is communicatively coupled to the user device 116 and the server arrangement 102, i.e. the user device 116 is communicatively coupled to the server arrangement 102 via the user profile module 104. In yet another example, the server arrangement 102 could be implemented by way of a cloud server arrangement 102, wherein the server arrangement 102 is configured to perform functions of the user profile module 104, the receiving module 106, and the data processing module 108.

Throughout the present disclosure, the term "data sources" refers to the source of the input data. The data sources 118 provide data in different types, including, but not limited to, real-time data (directly from sensors) and offline data (from and/or via databases). The data sources 118 provide data including, but not limited to, datasets (e.g., in .CSV formats or .JSON formats). In an example, a data source 118 is a sensor. The sensors include, but are not limited to, temperature sensors, proximity sensors, accelerometers, infrared sensors, heat sensors, ultrasonic sensors, heat, gas and smoke sensors, touch sensors, humidity sensors, current sensors and voltage sensors. Optionally, the data source may provide data in formats, such as images and live video feeds. In such case, the server arrangement may be equipped with processors specially designed for processing of images and live videos (such as digital signal processors) to obtain relevant information therefrom. Furthermore, the data from images and/or videos may be pre-processed outside the server arrangement (e.g., to extract object fingerprints and geospatial information) and then fed to the server arrangement for generating data visualization relating to data corresponding to images and live video feeds.

Additionally, the data source 118 is an internet of things (IOT) device to receive input data for generating data visualization. The IOT devices may include a plurality of electronic devices, cameras, video recorders, home appliances, vehicles and health monitoring devices that interact and exchange data. In an example, the IOT devices include, but are not limited to, computers, mobile phones, cameras, traffic lights, vehicle control systems, flight control systems, and seismic monitors. Furthermore, the data source 118 is a database comprising data pertaining to organizations, institutions or individuals. For example, the data source 118 may include, but not limited to, databases maintained by a government of a country comprising information about business and economy, crime and justice, defense, health and society, population and sex ratio, energy resources and pollution levels. In another example, the data source 118 may be a database maintained by an organization or a firm containing information, such as personal information of employees, salary structure of employees, production in the past years and the like.

Figure 4:
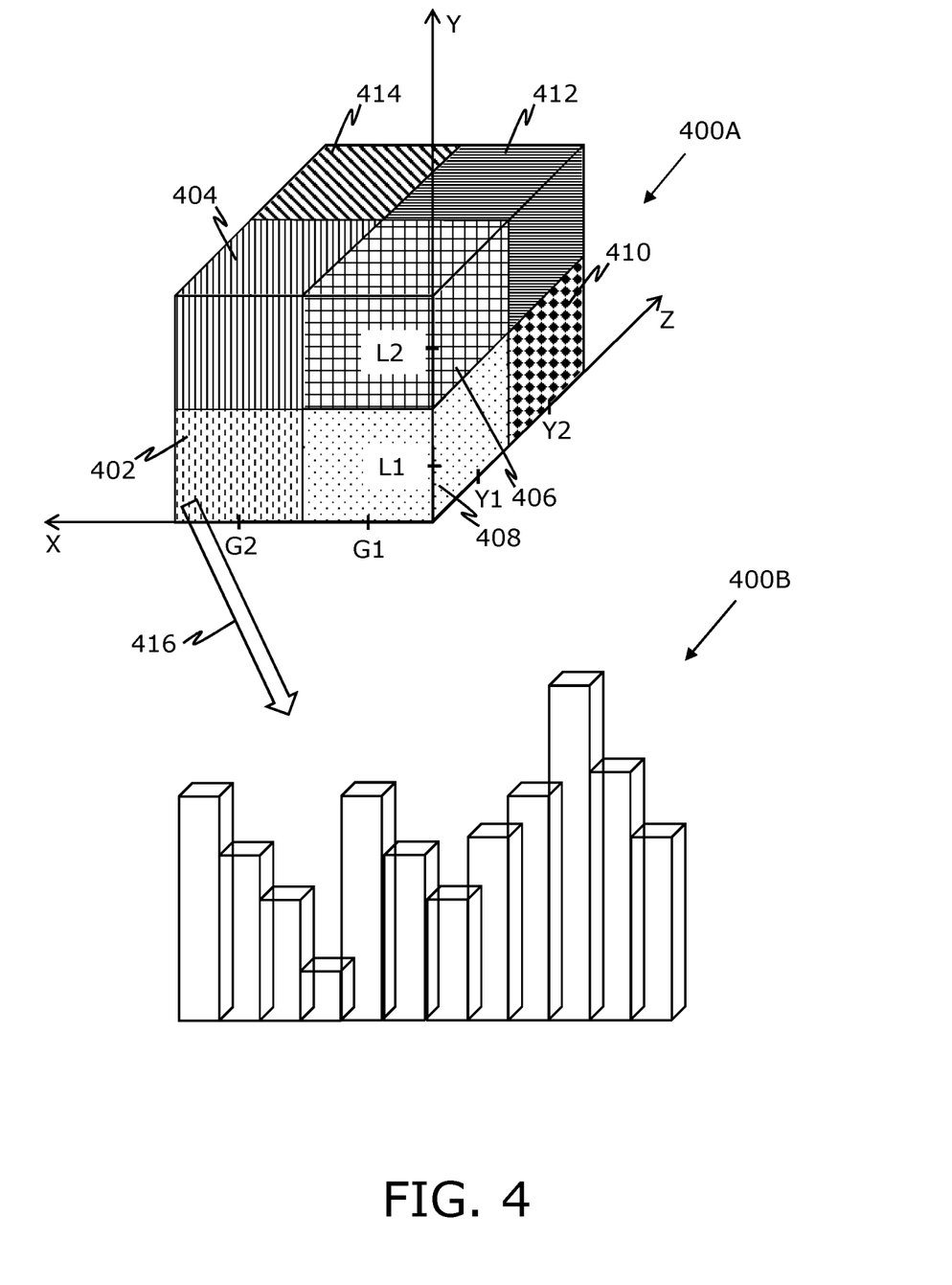
FIG. 4 is an illustration of a schematic representation of at least one data-object drawn in a visualization space, in accordance with an embodiment of the present disclosure.

Throughout the present disclosure, the term "data-objects" refers to the objects used to efficiently visualize data. The data-objects (such as data object 400A, 400B, as shown in FIG. 4) are used to represent two dimensional, three dimensional or multidimensional data in a graphical form. In some cases, dataset corresponding to the data-object 400A has also been referred to with the same term without any limitations. In an example, different data-objects 400A include, but are not limited to, a bar chart, a pie chart, a line chart, a histogram, a scatter plot, a data cube, a cartogram, a dot distribution chart, an area map, a matrix, and a heat map. Notably, several data-points retrieved from a data source 118 are represented/plotted in the form of data-objects 400A in order to visualize the data-points. The data-object 400A are represented with the aid of parameters associated with the data-object 400A, including, but not limited to, X-axis, Y-axis, Z-axis, color, shape, transparency, and motion depending on the dimensionality of the data. The data-object 400A are not limited to only graphical representations of data; the data-object 400A also include symbolic representation of data. In an example, in a virtual reality (VR) environment, the data visualization related to an operation of a wind turbine generator may include a data-object 400A represented as a wind turbine, rendering an effective interactive visualization for the user. Hereinafter, an immediate smaller unit of data-object 400A is referred an element (such as 402, 402, 406, 408, 410, 412, 414, as shown in FIG. 4) of data-object 400A with respect to the data-object 400A.

Throughout the present disclosure, the term "user interface (UI" (such as first user interface and second user interface) relates to a structured set of user interface elements rendered on a display screen. Optionally, the user interface (UI) rendered on the display screen is generated by any collection or set of instructions executable by an associated digital system. Additionally, the user interface (UI) is operable to interact with the user to convey graphical and/or textual information and receive input from the user. Specifically, the user interface (UI) used herein is a graphical user interface (GUI). Furthermore, the user interface (UI) elements refer to visual objects that have a size and position in user interface (UI). A user interface element may be visible, though there may be times when a user interface element is hidden. A user interface control is considered to be a user interface element. Text blocks, labels, text boxes, list boxes, lines, and images windows, dialog boxes, frames, panels, menus, buttons, icons, etc. are examples of user interface elements. In addition to size and position, a user interface element may have other properties, such as a margin, spacing, or the like.

According to an embodiment, the user profile module 104 is configured to define one or more user profiles. Each user profile contains information pertaining to a user associated with the user profile. The information pertaining to the user, includes a designation of the user, a location of the user and so forth. It will be appreciated that the term "user" as used in "user profile" is not limited to a single individual. The "user" may be an individual, a group of individuals, an organization (say, a company or a firm) and so forth. Furthermore, the term "user" as used herein relates to any entity including a person (i.e., human being) or a virtual personal assistant (an autonomous program or a bot), using the data visualization system 100 described herein.

Furthermore, the user profile module 104 is configured to associate one or more data sources 118 and data-object 400A to the one or more defined user profiles. The one or more data sources 118 are associated to the user profile based on the information in the user profile. In an example, the user profile defines the user to be an area manager of a wind turbine generator site. Then, the user profile module 104 associates several sensors related to the wind turbine generator, such as a sensor to determine wind speed, a sensor to determine rotor speed, a sensor to determine generator speed, a sensor to determine generator torque, a sensor to determine power generated and so forth. Additionally, the user profile is associated to a database comprising data for the wind turbine generator site in the past years. Furthermore, the one or more data sources 118 are associated to the user profile based on the information in the user profile, in an automated manner by the user profile module 104, in a semi-automated manner or manually by the user of the associated user profile via the first user interface. In an example, the user profile module 104 automatically associates one or more data sources 118 relevant to the user profile based on the information in the user profile. In another example, the one or more data sources 118 are presented to the user (say, in the form of list) via a first user interface (not shown) allowing the user to select one or more relevant data sources 118 from a represented list of data sources 118. In yet another example, the user is allowed to add one or more data sources 118 manually via the first user interface. Notably, a user profile may be accessible to the user for addition of data sources 118, and modification or updating of data sources 118 via the first user interface accessible to the user, for example via the user device 116. It will be appreciated that the user profile is accessible to one or more users associated with the user profile, for a collaborative data visualization experience, wherein each user is enabled to view the same generated data-object 400A at the same time. In an example, a user may invite other users for collaboratively visualizing the data in an efficient manner at the same time. In such a case, the user inviting other users may serve as the "administrator" and therefore control and regulate the information being shared with the other users. The administrator for a user profile is operable to invite one or more users to access the data, visualize the generated data-objects 400A and share information and ideas. Beneficially, the users in different geographical location or same different geographical locations are enabled to visualize the data in the visualization space associated with each user at the same time.

Furthermore, the user profile module 104 is configured to associate one or more data-object 400A to the one or more defined user profiles. The data-object 400A are associated to the user profile based on the information in the user profile and the one or more data sources 118 associated with the user profile. For example, the user profile associated with an owner of a wind turbine generator company is associated to data-object 400A which may be helpful to the said owner to monitor and/or diagnose operations of the one or more wind turbine generators installed by the said company in one or more remote sites. Furthermore, the one or more data-object 400A are associated to the user profile based on the information in the user profile, and the one or more data sources 118 associated to the user profile, in an automated manner by the user profile module 104, in a semi-automated manner or manually by the user of the associated user profile via the first user interface. In an example, the user profile module 104 automatically associates one or more data-object 400A relevant to the user profile based on the information in the user profile and the one or more data sources 118. In another example, the one or more data-object 400A are presented to the user (say, in the form of list) via the first user interface allowing the user to select one or more relevant data-object 400A from a list of available data-object 400A.

It will be appreciated that the user profile module 104 can be implemented differently in different architectures possible. In an example, the user profile module 104 can be implemented as a part of the server arrangement 102. In another example, the user profile module 104 can be implemented as an independent module communicatively coupled to the server arrangement 102.

According to an embodiment, the database arrangement 110 is configured to store data retrieved from one or more data sources 118. In one example, the data source 118 is at least one sensor, associated with the user profile, which can provide data for which the data visualization is to be generated. In such case, the database arrangement 110 acts as a data repository whereat the data is stored. Herein, the database arrangement 110 may be a compressed database, and data retrieved from one or more data sources 118 is compressed prior to storing on the database arrangement 110. Examples of the at least one sensor include, but are not limited to, a temperature sensor, a proximity sensor, an accelerometer, an infrared sensor, a heat sensor, an ultrasonic sensor, a gas detector and smoke detector, a touch sensor, a humidity sensor, a current sensor and a voltage sensor.

In another embodiment, the data source 118 is at least one database, wherein the at least one database is configured to store the data pertaining to the user profile for which data visualization is to be generated. Optionally, the at least one database obtains the data, pertaining to a user profile for which the data visualization is to be generated, from the at least one sensors associated with the user profile. In such case, the at least one database acts as a data repository whereat the data is stored. Optionally, the at least one database is a standalone database associated with an organization (namely, a firm, an establishment or a company), or another organization (namely, a firm or an establishment) associated to a user profile, the data from which is relevant or required for generating data visualization for the user profile. In another embodiment, the data source 118 may be the database arrangement 110 itself configured to store a datasheet or data values from which data visualization is to be generated, which may optionally be provided by a user associated with the associated user profile. Optionally, the data source 118 is a history database containing previously recorded data, a legacy database containing all the available data related to a particular data-object 400A, a related database containing optional data related to a sensor such as geographical location (such as geospatial latitude, geospatial longitude, etc.), threshold limits and so forth. Herein, the term "database" refers to hardware, software, firmware, or a combination of these for storing information in an organized (namely, structured) manner, thereby, allowing for easy storage, access (namely, retrieval), updating and analysis of such information. The term "database" also encompasses database servers that provide the aforesaid database services to the system 100 for generating data visualization.

According to an embodiment, the data processing module 108 is configured to determine connections between the one or more data sources 118 and data-object 400A to be visualized based on the user profile. Herein, the determined connections indicate individual fields of a data record that can be connected to data-object 400A which represent parameters for generating data visualization. In some examples, an input parameter of data from a data source 118 is used to indicate the connection to the data field(s) in the database. Furthermore, the data processing module 108 is operable to store the defined data sources 118, defined data-object 400A and connections between the one or more sources to data-object 400A on the database arrangement 110 in form of a dataset. The formed dataset is the basis for retrieving data for generating data visualization efficiently. In some examples, the dataset is accessible to the user for updating, modifying or deleting the one or more data sources 118 and/or one or more data-object 400A according to the requirements of the user. Optionally, prior to storing the defined data sources 118, defined data-object 400A and connections between the one or more sources to data-object 400A in the database arrangement 110, the defined data sources 118, defined data-object 400A and connections between the one or more sources to data-object 400A are compressed to efficiently store the data in the database arrangement 110 in the form of a dataset. Notably, different algorithms may be employed for achieving data compression of large data.

Furthermore, the connections are determined between the one or more data sources 118 and data-object 400A to be visualized by connecting data fields of the parameters of one or more data-object 400A. In an example, the database may include data related to employees of a company for the past four years. The data-object 400A associated to the user profile may be a data cube representing information about the employees. For generating data visualization, each of the parameter (such as height of the data cube, length of the cube, breadth of the cube, color of each data-point and so forth) of the data cube may be associated with one of the data fields of the retrieved data (such as name of the employee, salary of the employee, number of employees in a department). Optionally, the connections between the data sources 118 and the data-object 400A can be defined manually by the user via the first user interface. The user is allowed to choose from an available list of data-object 400A and connect it to the relevant data sources 118 required for generating desired data-object 400A for visualization. Subsequently, the defined data sources 118, defined data-object 400A and connections between the one or more sources to data-object 400A are stored in the database in form of a dataset.

According to an embodiment, the receiving module 106 is configured to receive a data visualization request from a user. Notably, the data visualization request can be initiated by a user device 116 manually, or the data visualization request can be generated automatically by the user device 116 based on certain pre-defined parameters. Also, the data visualization request generated manually can be a typed request, a voice command request or a gesture-based command (for example, in case of AR or VR devices). Optionally, the data visualization request can be initiated manually by accessing the user profile associated with a particular user and selecting one or more data-object 400A enlisted therein. Optionally, an automatic visualization request can be generated by the user device 116 based a set of rules, such as generating data visualization after regular intervals of time (say, hourly, weekly, monthly and so forth), generating data visualization in case of an alert or emergency and the like. In an example, an automatic data visualization request is generated by the user profile to generate data visualization, when the data values exceed a pre-defined threshold value. In another example, an automatic data visualization request is generated in case of a failure of an equipment in an industry, subsequently notifying the user about the failure through alerts on the user device 116, say via an SMS alert.

According to an embodiment, the data processing module 108 is configured to select one or more data sources 118 from the one or more data sources 118 based on the data visualization request. In an example, the selection of the one or more data sources 118 relies upon keywords extracted from the data visualization request. The keywords extracted are matched with the parameters of the data-object 400A associated with a particular user profile to select one or more data-object 400A. The selected data-object 400A are subsequently used to select one or more data sources 118 from the one or more data sources 118 associated with the user profile using the connections defined therewith as aforementioned.

Furthermore, data is retrieved from the one or more defined data sources 118, with a plurality of data-points. Optionally, the data can be retrieved in real-time from the selected one or more data sources 118 based on the visualization request. For example, the user requests the current status of the sensors in an industry, then data is retrieved in real-time. Optionally, the retrieved data, with the plurality of data-points is stored in the database arrangement 110 linked to the associated data source 118 in the dataset. In an example, the retrieved data from a particular data source can be stored in the database arrangement 110 in the form of linked lists, wherein the data retrieved from a particular data source 118 is linked to the particular data source 118 in the dataset.

According to an embodiment, the data processing module 108 is configured to generate at least one data-object 400A based on the retrieved data from the one or more data sources 118. The data processing module 108 is configured to process the data, wherein processing the data includes filtering the data according to the data visualization request, performing arithmetic and logic operations (for example, averaging the data, normalizing the data and so forth) to obtain meaningful results from the plurality of data-points. In an example, if data visualization is requested for performance analysis of a device in the past month, then data (as obtained from the sensor associated with the said device) for the requested month is filtered out from a database containing data, say for past year, for further processing. Optionally, the plurality of data-points in the retrieved data is sorted prior to filtering the data. In an example, the data can be sorted based on one or more of, but not limited to, a data type, a data size, and a date and time of data. Subsequently, a data visualization description is generated for each of the data-object 400A by assigning processed values for each data-point to the corresponding parameters of the data-object 400A, and the data fields are assigned as corresponding labels for the data-object 400A. For instance, if the data for cars sold by a company in a year is to be visualized, then the data is sorted and filtered according to the date of sale of each car, and the data is grouped accordingly for each month. In other words, the data for cars sold in the month of January are filtered and grouped together. Similarly, data pertaining to cars sold in the particular year is grouped for the month of February, March, April, May, June, July, August, September, October, November, and December. A data visualization description is then generated for each month or the year as requested by the user for visualization. Subsequently, the requested data is visualized in the visualization space for each month and for the entire year.

Optionally, the user device 116 is configured to draw the at least one generated data-object 400A corresponding to the data visualization request in a visualization space associated with the user profile. For this purpose, the user device 116 is configured to draw the at least one data-object 400A with one or more of values and labels associated with the plurality of data-points thereof, in the visualization space. The term "visualization space" refers to the space where the data-object 400A, 400B are visualized, including, but not limited to, a display associated with a user device 116, such as, a mobile phone, a smart telephone, a Mobile Internet Device (MID), a tablet computer, an Ultra-Mobile Personal Computer (UMPC), a phablet computer, a Personal Digital Assistant (PDA), a web pad, a Personal Computer (PC), a handheld PC, a laptop computer, a tablet computer. The term "visualization space" also refers to Virtual Reality (VR) spaces or Augmented Reality (AR) surfaces. Herein, the term "visualization space" has been used generally to refer to both a three-dimensional space or a two-dimensional surface without any limitations.

In an exemplary implementation, the user device 116 associated with a user receives the generated data-object 400A, 400B in the form of data visualization description, pertaining to the generated data-object 400A, 400B. Furthermore, a graphics processing unit in the user device 116 acquires the data visualization description and further processes the data visualization description into the corresponding data-object 400A with values and labels at positions. Subsequently, the data-object 400A is drawn on the visualization space associated with the user device 116. In case of VR environments and AR environments, the positions of the data-object 400A are calculated prior to drawing the data-object 400A. Beneficially, the drawn data-object 400A can be saved in a memory associated with the user device 116 for later retrieval.

Optionally, a user is allowed to generate a data visualization update request (best shown in FIG. 4, as 416) for a data-object 400A from the at least one drawn data-object 400A in the visualization space via a second user interface (not shown). In some examples, the first user interface and the second user interface may be parts of a single user interface without departing from the scope of the present disclosure. The data visualization update request 416 can be sent by the user by tapping or clicking on a particular visualized data-object 400A via the second user interface. The data visualization update request 416 can also be sent by hand gestures or head movements in a virtual reality (VR) space or augmented reality (AR) space. In an example, in a virtual reality environment, zooming on a particular data-object 400A sends a data visualization update request 416 for the particular data-object 400A. Furthermore, the user device 116 is configured to re-draw the at least one data-object 400B associated with the data visualization update request 416. For example, for a data cube representing different types of cars sold in different countries in the past four years, an update visualization request 416 can be initialized by tapping on a particular country, a particular car, or a particular year thereby obtaining data for each element of the data-object 400A or data-point or by zooming-in on a particular element of the data-object 400A in case of a virtual reality (VR) environment.

Optionally, the receiving module 106 is configured to receive a data visualization update request 416 from the user profile. In such case, the data processing module 108 is configured to generate at least one updated data-object based on the data visualization update request 416 The updated data-object 400B is generated in a similar manner as described above; involving selection of one or more data sources 118 from the one or more data sources 118 based on the data visualization update request, and retrieving data associated with the one or more selected data sources 118, with plurality of data-points, based from the one or more data sources 118 based on the data visualization update request 416. Further, the user device 116 is configured to draw the at least one updated data-object 400B associated with the data visualization update request. In some examples, the user device 116 may provide suitable animations while switching between the different data-object 400A, 400B in the visualization space, for providing rich visualization experience for the user.

Optionally, the data processing module 108 is further configured to define a grade index with a maximum value and a minimum value. Further, a gradient value is determined for each of the plurality of data-points of the retrieved data within the grade index. In an example, to validate the data, a maximum value and a maximum value is selected for the plurality of data-points retrieved based on the data visualization request. The data value corresponding to each of the plurality of data-points is compared with the maximum value and the minimum value. If the data value associated with a particular data-point is greater than the selected maximum value, gradient value "0" is assigned to the data-point. Further, if the data value associated with a particular data-point is lesser than the selected minimum value, gradient value "255" is assigned to the data-point. It is to be understood that the given minimum and maximum values are arbitrary and may vary based on the configuration of the data visualization system 100. For the data-points that lie within the gradient index, the following mathematical formula may be employed to calculate the gradient value for each of the retrieved data-points lying within the gradient index:

Gradient Value=(Data value)/(maximum value−minimum value)*254

Subsequently, a color is assigned to each of the gradient value for drawing the at least one generated data-object 400A in the visualization space. Optionally, the retrieved data with plurality of data-points along with corresponding gradient values are stored in the database arrangement 110 for later retrieval. Hereinafter, the obtained data corresponding to the graded value has sometimes been referred to as "validated data".

In an example, for data retrieved from a temperature sensor is generally expected to vary from 10 degrees Celsius to 50 degrees Celsius, herein the minimum temperature value and the maximum temperature value may be defined as, say, 10 degrees Celsius and 50 degrees Celsius, respectively. All temperature values above the maximum value (50 degrees Celsius) are assigned a single color, say dark blue and all the temperature values below the minimum value (10 degrees Celsius) are assigned another color, say bright red. Further, for each of the temperature values (data-points) that lie within the gradient index, a gradient value is determined and a color is assigned to each gradient value corresponding to the validated temperature value. Beneficially, the validated temperature values are plotted in the form a heat map, wherein each of the temperature value is plotted in an increasing gradient value corresponding to a particular data-point, thereby drawing a data-object 400A related to the temperature fluctuation with a gradient from a light color to a dark color for reference of the user.

In an exemplary implementation, a user is prompted to create a user profile by the user profile module 104 with information pertaining to geographical location, designation and so forth via the first user interface. Further, one or more data sources 118 are associated to the user profile based on the information on the user profile, or added manually by the user. Also, data-object 400A are associated to the user profile based on the information in the user profile and the associated data sources 118. Further, the data processing module 108 determines connections determine connections between the one or more data sources 118 and data-object 400A to be visualized based on the user profile. The data sources 118 and data-object 400A associated to the user profile and the determined connections therewith are stored on the database arrangement 110 in the form of a dataset. Further, a data visualization request is sent to the server arrangement 102 by the user device 116, wherein the receiving module 106 is configured to receive the data visualization request. Further, one or more data sources 118 are selected from the one or more data sources 118 based on the visualization request. Further, data is retrieved with plurality of data-points, from the one or more data sources 118 based on the data visualization request. The retrieved data is then sorted and validated by defining a grade index with a minimum value and a maximum value. Further, a gradient value is determined for each of the plurality of data-points within the grade index and a color is assigned to each data-point based on its determined gradient value. The graded or validated data is then stored on the database for later retrieval. Further, the data visualization is generated by passing the data field as label and the data associated with the label as value. Further, the user device 116 receives the generated data-object 400A and colors the data-object 400A with assigned index color associated with each validated data-point. The data-object 400A are then drawn in the visualization space by the user device 116 using graphic image generation techniques as known in the art. Further, in case the user selects, by clicking or tapping, a data element of the drawn data-object 400A, a visualization update request 416 is sent with the information about the selected element of the data-object 400A for purposes of further filtration for retrieving of the data. The retrieved data is filtered according to the data visualization update request 416 to be processed for generation of at least one updated data-object 400B, and the at least one updated data-object 400B is then drawn in the visualization space. Furthermore, in case of complex three-dimensional data-objects which are complicated to be drawn by the user device 116, the server arrangement 102 may provide pre-drawn data objects to the user device 116. That is, the complex three-dimensional data-objects can be loaded directly from the server arrangement 102 to the user device 116 for visualization. Moreover, the complex three-dimensional data-object imported from the server arrangement 102 is presented on the visualization space associated with the user and modulated according to the data visualization request. For instance, a 'population density' visualization for each country of the world, plotted for every geographical location is a very complex data. In such case, the related data-object may first be drawn in the server arrangement 102 and then is exported to the user device 116 for direct visualization.

Optionally, the data visualization system 100 of the present disclosure can be implemented for providing predictive modelling of various systems and business ideas, predictive maintenance of various industries and warehouses and so forth. In an exemplary implementation, a wind turbine generator park is visualized in a mixed reality (MR) environment wherein each of the wind turbines is represented as a data-object 400A plotted in a geospatial context using the latitude and longitude values provided by a senor, along with other related data such as wind speed in the location, position of the sun and the like. The performance of each wind turbine can be visualized by requesting data visualization update, and constantly compared against defined thresholds to generate alerts if the thresholds are exceeded.

In another exemplary implementation, the geographical positions of the aircraft in the respective air fields are plotted, thereby visualizing and controlling air traffic in a mixed reality (MR) environment. Each of the aircraft is plotted in a geospatial context using the latitude and longitude values provided by a sensor (here, RADAR), along with other sensors such as GPS tracking systems, speedometer, weather conditions and the like. The information can be used to maintain orderly flow of air traffic by plotting each airplane under surveillance as a data-object 400A in the mixed reality (MR) environment and information related to each airplane is obtained by tapping on each airplane. Such a data visualization system 100 enables the user to efficiently track the movement of aircrafts and avoid collisions between aircrafts and any obstructions on the ground. In case of an emergency, alerts can be raised by changing the color of an aircraft depicted as a data-object in the visualization space to 'RED', for example.

In yet another exemplary implementation, information such as people count, vehicle count, patterns, potential threats and the like may be extracted as data-points from data, such as live video feed. Further, projections of such data-points are made onto corresponding points, for example in a map (i.e. geospatial) as a visualization. Such visualization may be utilized to analyze geographical location information of objects or people in the live video or image feed, and the like. For example, a homographic projection of points in a video feed onto corresponding points in a map (i.e. geospatial), or on a floorplan may be utilized to extract location information of objects or people in the video or image feed. The obtained information may be advantageous in a plurality of applications including, but not limited to, traffic flow analysis of an area and safety and security maintenance of public places (such as airports, oil and gas companies, shopping malls and so forth).

Figure 2:
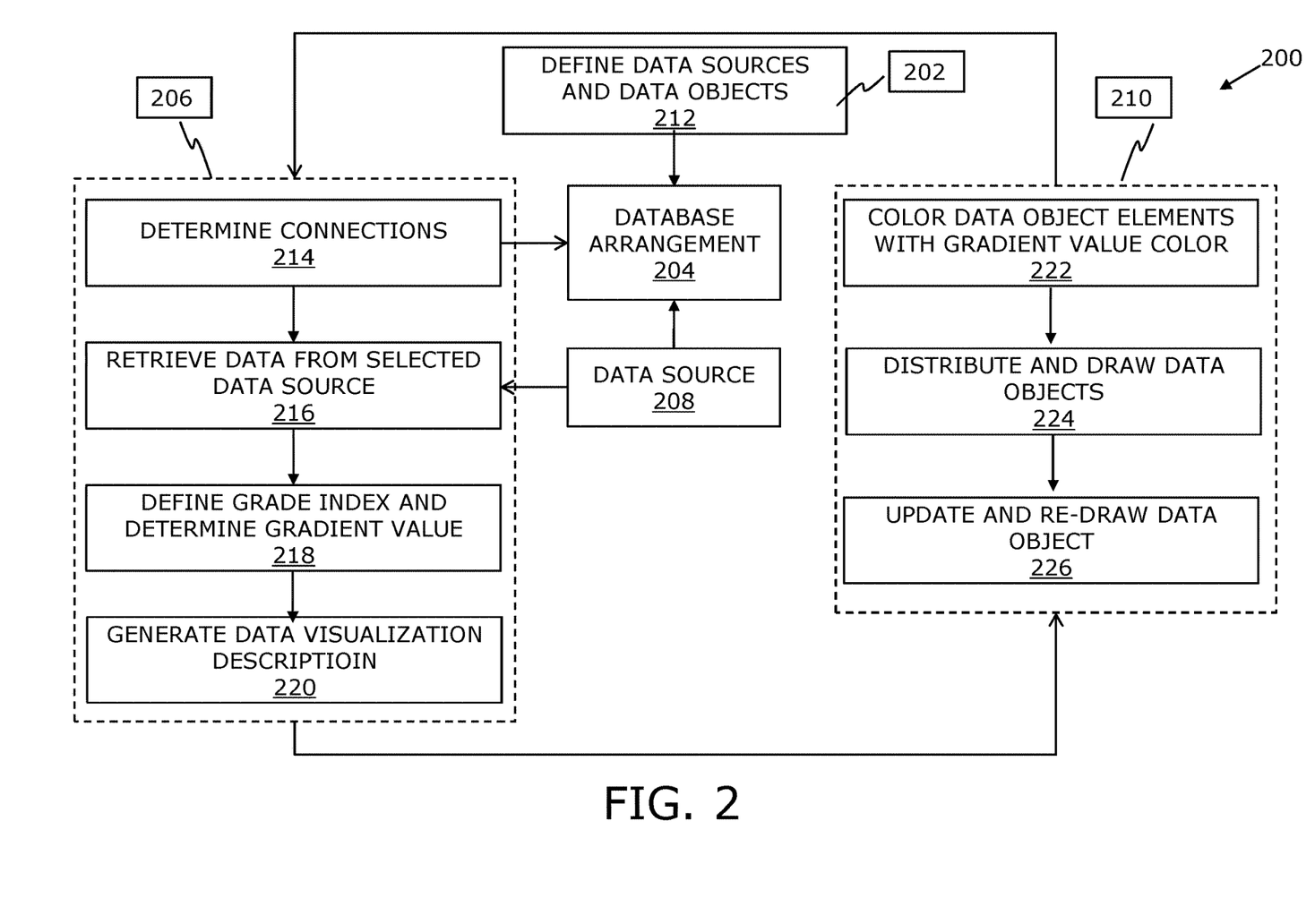
FIG. 2 is an illustration of schematic representation of the system showing exemplary connections between components thereof, in accordance with an embodiment of the present disclosure.

Referring to FIG. 2, illustrated is a schematic representation of an exemplary user profile module 202, a database arrangement 204, a data processing module 206, a data source 208 and a user device 210, pertaining to a data visualization system 200 (similar to the system 100 of FIG. 1), in accordance with an embodiment of the present disclosure. At a step 212, in the user profile module 202, one or more data sources and one or more data-object are associated with the user profile of the given user. At a step 214, in the data processing module 206, connections are determined based on the user profile between the associated one or more data sources (such as, a data source 208) and one or more data-object (such as data-object 400A, as shown in FIG. 4) associated with the user profile and stored in the database arrangement 204. At a step 216, in the data processing module 206, a data visualization request is received from the user profile and data is retrieved from the selected data source 208 associated with user profile via the database arrangement 204 based on the data visualization request. At a step 218, in the data processing module 206, data is validated by defining a grade index with a maximum value and a minimum value, determining a gradient value for each of the plurality of points of the retrieved data within the grade index and assigning a color to each of the gradient value. At a step 220, in the data processing module 206, data visualization description is generated for at least one data-object and sent to the user device 210 for drawing the at least one data-object in the visualization space for the user.

Furthermore, the user device 210 receives the generated data visualization description for the at least one data-object. At a step 222, in the user device 210, each of the plurality of data-points is colored with the associated with the gradient value. At a step 224, in the user device 210, the at least one data-object is drawn in the visualization space. At a step 226, in the user device 210, any click/tap on a particular data-object element is detected to generate a data visualization update request and updated data-object are drawn on the visualization space based on the data visualization update request.

Figure 3:
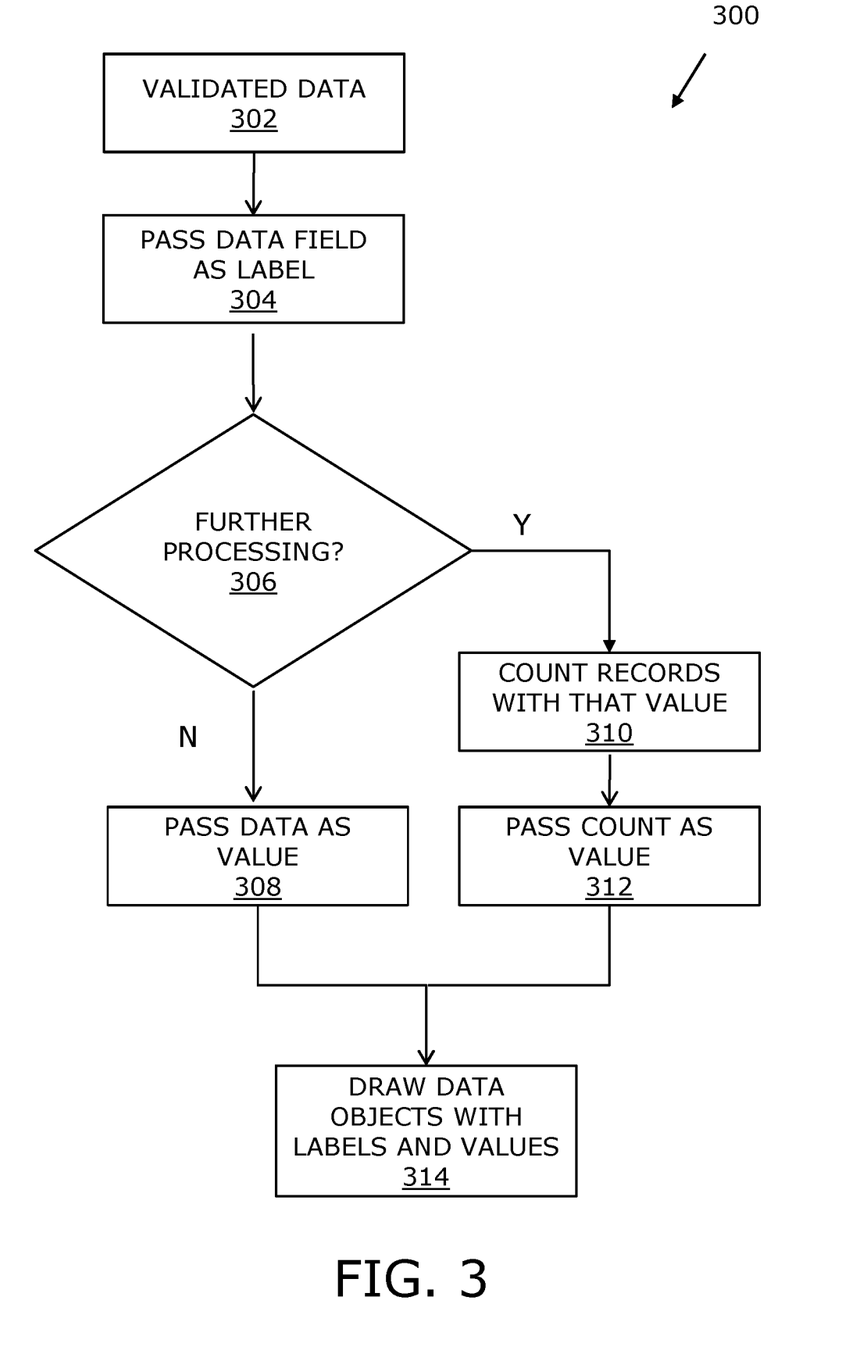
FIG. 3 is an illustration of a flowchart depicting operation of the system for generating data visualization, in accordance with an embodiment of the present disclosure.

Referring to FIG. 3, illustrated is a schematic representation of a process 300 for generating data visualization description for generating at least one data-object. At a step 302, validated data is obtained after validation. At a step 304, the data field of associated with the data-point is passed as value. At a step 306, a decision is made that whether further processing of the validated data is required or not based on the data visualization request. Notably, path N is followed if further processing is not required and path Y is followed if further processing is required. In a case when the path N is followed, at a step 308, the data associated with the data-point is passed as value. In a case when the path Y is followed, at a step 310 records associated with value are counted. Further, at a step 312, the count as value is passed. At a step 314, the data-object is drawn with labels and values at position.

Referring to FIG. 4, illustrated is a schematic illustration of a data-object 400A visualized in a visualization space, in accordance with an embodiment of the present disclosure. Notably, the data-object 400A is a data cube representing power generated by two generators G1 and G2 at two different locations L1 and L2 in two years Y1 and Y2. As illustrated, power generated by generators G1 and G2 are plotted on the X-axis (namely, a horizontal axis), locations L1 and L2 are plotted on the Y-axis (namely, a vertical axis), the years Y1 and Y2 are plotted on the Z-axis (namely, an imaginary axis into the plane of the paper). The data-object 400A is comprised of eight data-object elements (seven of the data-object elements are being visible as 402, 404, 406, 408, 410, 412 and 414). In case, when the data-object 402 is selected, a representative data visualization update request 416 is generated, and thereafter an updated data-object 400B in the form of a bar graph is visualized representing power generated by the generator G2 at the location L1 in the year Y1. Notably, each bar in the bar graph represents power generated by G2 in each of the twelve months of the year Y1.

The present disclosure also relates to the method of generating data visualization. Various embodiments and variants disclosed above apply mutatis mutandis to the method.

Figure 5:
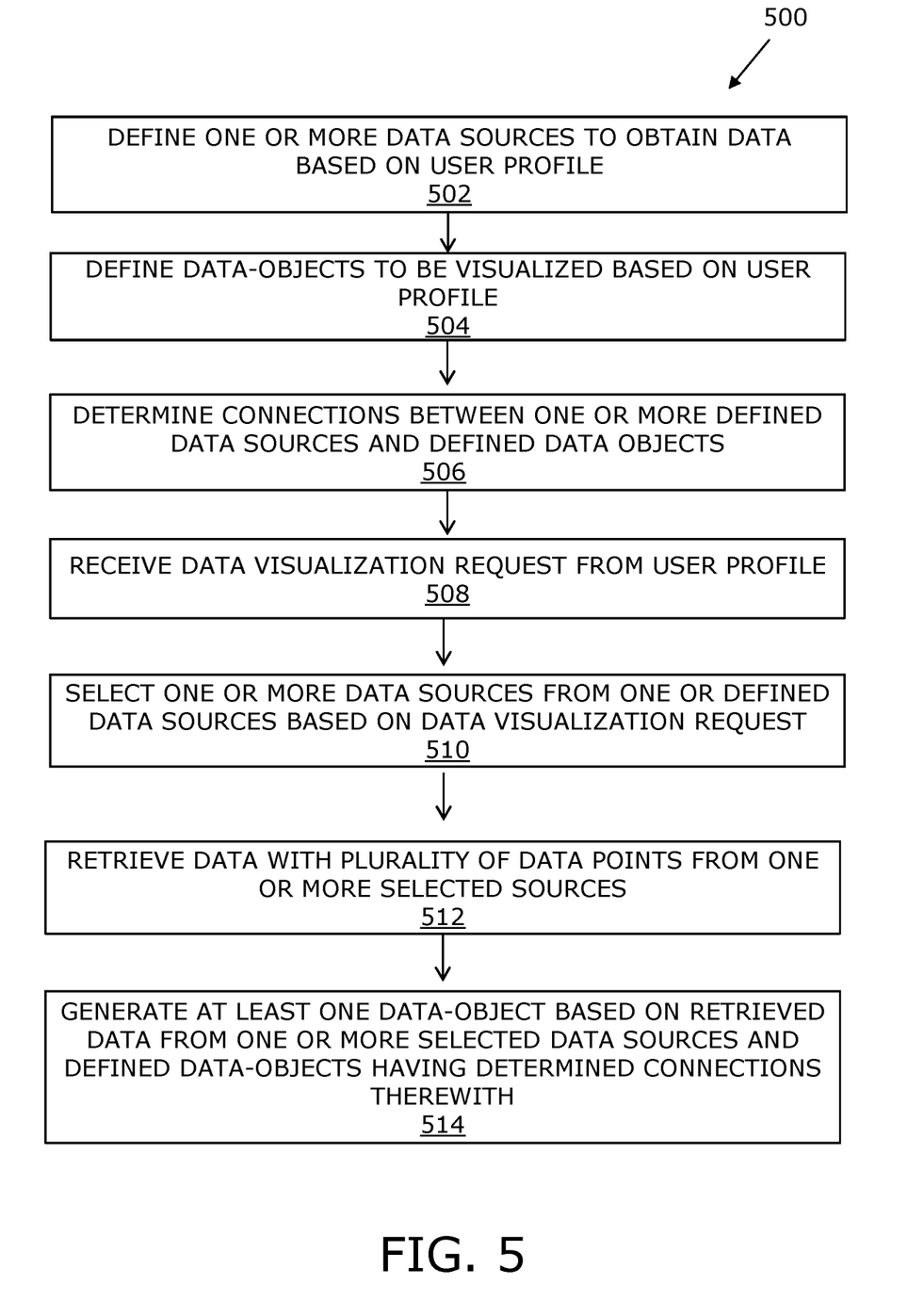
FIG. 5 is an illustration of schematic representation of steps of a method for generating data visualization, in accordance with an embodiment of the present disclosure.

Referring to FIG. 5, illustrated are steps of a method 500 of generating data visualization, in accordance with an embodiment of the present disclosure. At a step 502, one or more data sources are defined to obtain data based on a user profile. At a step 504, data-object are defined to be visualized based on the user profile. At a step 506, connections are determined between the one or more defined data sources and the defined data-object to be visualized. At a step 508, a data visualization request is received from the user profile. At a step 510, one or more data sources are selected from the one or more defined data sources based on the data visualization request. At a step 512, data associated with the one or more selected sources is retrieved with plurality of data-points. At a step 514, at least one data-object is generated based on the retrieved data associated with the one or more selected data sources and the defined data-object having determined connections therewith.

The steps 502 to 512 are only illustrative and other alternatives can also be provided where one or more steps are added, one or more steps are removed, or one or more steps are provided in a different sequence without departing from the scope of the claims herein.

Optionally, the method 500 further comprises filtering the retrieved data based on the data visualization request.

Optionally, the method 500 further comprises drawing the at least one generated data-object corresponding to the data visualization request in a visualization space associated with the user profile.

Optionally, the method 500 further comprises drawing the at least one generated data-object corresponding to the data visualization request in a visualization space associated with the user profile.

Optionally, the at least one data-object is drawn with one or more of values and labels associated with the plurality of data-points thereof, in the visualization space.

Optionally, the method 500 further comprises defining a grade index with a maximum value and a minimum value; determining a gradient value for each of the plurality of data-points of the retrieved data within the grade index; and assigning a colour to each of the gradient value for drawing the at least one generated data-object in the visualization space.

Optionally, the method 500 further comprises storing the retrieved data with plurality of data points along with corresponding gradient values for later retrieval.

Optionally, the method 500 further comprises receiving a data visualization update request from the user profile.

Optionally, the method 500 further comprises generating at least one updated data-object based on the data visualization update request; and drawing the at least one updated data-object associated with the data visualization update request.

Optionally, the one or more data sources comprises at least one database comprising one or more of related data, historic data, and legacy data for the user profile.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system (100) for generating data visualization, the system comprising:
    a database arrangement (110) configured to store data retrieved from one or more data sources (118); and
    a server arrangement (102) comprising:
        a user profile module (104) configured to define one or more user profiles, and associate one or more data sources (118) and data-object (400A, 400B) to the one or more defined user profiles, wherein the one or more data sources (118), the data objects (400A, 400B) and, the connections between the one or more data sources (118) and the data objects (400A, 400B) are stored in the database arrangement (110) in the form of a dataset;
        a receiving module (106) configured to receive a data visualization request from a user, wherein the data visualization request is initiated by the user based on at least one parameter associated with data object (400A, 400B); and
        a data processing module (108) configured to:
            determine connections between the one or more data sources (118) and data-object (400A, 400B) to be visualized based on the user profile by connecting at least one data field of the retrieved data with at least one parameter associated with data object (400A, 400B);
            select one or more data sources (118) from the one or more data sources (118) based on the data visualization request;
            retrieve data associated with the one or more selected data sources, with plurality of data-points, based on the data visualization request;
            generate at least one data-object (400A) based on the retrieved data from the one or more selected data sources (118) and the defined connections therewith; and
            generate at least one updated data-object (400B) based on the data visualization update request, and wherein a user device (116) is configured to draw the at least one updated data-object (400B) associated with the data visualization update request (416).

2. The system according to claim 1 further comprising a first user interface to allow the user to define one or more data sources (118) for obtaining data to be associated with the user profile.

3. The system according to claim 1, wherein the data processing module (108) is further configured to filter the retrieved data based on the data visualization request.

4. The system according to claim 1, wherein the data processing module (108) is further configured to:
    define a grade index with a maximum value and a minimum value;
    determine a gradient value for each of the plurality of data-points of the retrieved data within the grade index; and
    assign a color to each of the gradient value for drawing the at least one generated data-object (400A) in the visualization space.

5. The system according to claim 4, wherein the database arrangement (110) is further configured to store the retrieved data with plurality of data-points along with corresponding gradient values for later retrieval.

6. The system according to claim 1 further comprising the user device (116) configured to draw the at least one generated data-object (400A) corresponding to the data visualization request in a visualization space associated with the user profile.

7. The system according to claim 6, wherein the user device (116) is configured to draw the at least one data-object (400A) with one or more of values and labels associated with the plurality of data-points thereof, in the visualization space.

8. The system according to claim 7 further comprising a second user interface to allow a user to generate a data visualization update request (416) for a data-object from the at least one drawn data-object (400A) in the visualization space.

9. The system according to claim 1, wherein the one or more data sources (118) comprises one or more sensors providing sensor data.

10. The system according to claim 1, wherein the one or more data sources (118) comprises at least one database comprising one or more of related data, historic data, and legacy data for the user profile.

11. A computer implemented method (500) for generating data visualization, comprising:
    defining one or more data sources for obtaining data based on a user profile;
    defining data-object to be visualized based on the user profile;
    determining connections between the one or more defined data sources and the defined data-object to be visualized by connecting at least one data field of the retrieved data with at least one parameter associated with data object (400A, 400B) wherein the one or more data sources (118), the data objects (400A, 400B) and, the connections between the one or more data sources (118) and the data objects ((400A, 400B) are stored in the form of a dataset;
    receiving a data visualization request from a user, wherein the data visualization request is initiated by the user based on at least one pre-defined parameter associated with data object (400A, 400B);

selecting one or more data sources from the one or more defined data sources based on the data visualization request;
retrieving data associated with one or more selected data sources with plurality of data-points;
generating at least one data-object based on the retrieved data from the one or more selected data sources and the defined data-object having determined connections therewith; and
generating at least one updated data-object (400B) based on the data visualization update request, and drawing the at least one updated data-object associated with the data visualization update request.

12. The method (500) according to claim 11, further comprising filtering the retrieved data based on the data visualization request.

13. The method (500) according to claim 11, further comprising drawing the at least one generated data-object corresponding to the data visualization request in a visualization space associated with the user profile.

14. The method (500) according to claim 13, wherein the at least one data-object is drawn with one or more of values and labels associated with the plurality of data-points thereof, in the visualization space.

15. The method (500) according to claim 13, further comprising:
defining a grade index with a maximum value and a minimum value;
determining a gradient value for each of the plurality of data-points of the retrieved data within the grade index; and
assigning a color to each of the gradient value for drawing the at least one generated data-object in the visualization space.

16. The method (500) according to claim 15, further comprising storing the retrieved data with plurality of data points along with corresponding gradient values for later retrieval.

17. The method (500) according to claim 11, further comprising receiving a data visualization update request from the user.

18. The method (500) according to claim 11, wherein the one or more data sources comprises at least one database comprising one or more of related data, historic data, and legacy data for the user profile.

* * * * *